United States Patent
Koenig et al.

(10) Patent No.: US 7,311,187 B2
(45) Date of Patent: Dec. 25, 2007

(54) DUAL CLUTCH TRANSMISSION CLUTCH COOLING CIRCUIT

(75) Inventors: Melissa Koenig, Howell, MI (US); Guenter Ebinger, Oestringen (DE); Michael Jung, Bruehl (DE)

(73) Assignee: BorgWarner Inc., Auburn Hills, MI (US)

( * ) Notice: Subject to any disclaimer, the term of this patent is extended or adjusted under 35 U.S.C. 154(b) by 260 days.

(21) Appl. No.: 11/150,991

(22) Filed: Jun. 13, 2005

(65) Prior Publication Data

US 2006/0006043 A1 Jan. 12, 2006

Related U.S. Application Data (63) Continuation-in-part of application No. 10/886,279, filed on Jul. 7, 2004, now abandoned.

(51) Int. Cl.
*F16D 13/72* (2006.01)

(52) U.S. Cl. ............ 192/48.8; 192/70.1; 192/113.3

(58) Field of Classification Search ............ 192/48.8, 192/70.12, 113.34
See application file for complete search history.

(56) References Cited

U.S. PATENT DOCUMENTS

| | | | |
|---|---|---|---|
| 3,490,312 A | 1/1970 | Seitz et al. | 74/711 |
| 3,589,483 A | 6/1971 | Smith | 192/3.52 |
| 3,760,918 A | 9/1973 | Wetrich et al. | 192/87.11 |
| 3,823,801 A | 7/1974 | Arnold | 192/87.19 |
| 4,205,739 A | 6/1980 | Shelby et al. | 192/113 |
| 4,270,647 A | 6/1981 | Leber | 192/113 |
| 4,461,188 A | 7/1984 | Fisher | 74/330 |
| 4,513,631 A | 4/1985 | Koivunen | 74/360 |
| 4,540,078 A | 9/1985 | Wetrich | 192/87.11 |
| 4,544,057 A | 10/1985 | Webster et al. | 192/0.076 |
| 4,713,980 A | 12/1987 | Ida et al. | 74/467 |
| 4,827,784 A | 5/1989 | Muller et al. | 74/330 |
| 4,841,803 A | 6/1989 | Hamano et al. | 74/665 |
| 5,495,927 A | 3/1996 | Samie et al. | 192/70.12 |
| 5,577,588 A | 11/1996 | Raszkowski | 192/113.35 |
| 5,613,588 A | 3/1997 | Vu | 192/113.35 |
| 5,662,198 A | 9/1997 | Kojima et al. | 192/87.11 |

(Continued)

FOREIGN PATENT DOCUMENTS

| | | |
|---|---|---|
| DE | 101 18 756 A1 | 5/2002 |
| FR | 1.246.517 | 10/1960 |
| GB | 2 036 203 | 6/1980 |

*Primary Examiner*—Rodney H. Bonck
(74) *Attorney, Agent, or Firm*—Bliss McGlynn, P.C.

(57) ABSTRACT

A hydraulic circuit for controlling the application of pressurized cooling fluid to the clutches of a dual clutch transmission including a cooling unit in fluid communication with a source of the pressurized cooling fluid and adapted to exchange heat from the cooling fluid with another media. The circuit also includes at least one regulator in fluid communication with the source of the pressurized cooling fluid and separately in fluid communication with the cooling unit, and with the clutches. The regulator is adapted to operatively provide the cooling fluid to the clutches. The circuit further includes at least one control actuator adapted to selectively control the regulator to provide a first variable predetermined amount of cooling fluid from the cooling unit to the clutches as primary cooling, and to provide a second variable predetermined amount of cooling fluid from the source to the clutches thereby supplementing the cooling fluid from the cooling unit.

17 Claims, 6 Drawing Sheets

U.S. PATENT DOCUMENTS

| | | | |
|---|---|---|---|
| 5,711,409 A | 1/1998 | Murata | 192/87.11 |
| 5,720,203 A | 2/1998 | Honda et al. | 74/325 |
| 5,755,314 A | 5/1998 | Kanda et al. | 192/70.12 |
| 5,890,392 A | 4/1999 | Ludanek et al. | 74/331 |
| 5,915,512 A | 6/1999 | Adamis et al. | 192/3.61 |
| 5,950,781 A | 9/1999 | Adamis et al. | 192/3.61 |
| 5,966,989 A | 10/1999 | Reed, Jr. et al. | 74/331 |
| 5,979,257 A | 11/1999 | Lawrie | 74/335 |
| 6,006,620 A | 12/1999 | Lawrie et al. | 74/335 |
| 6,012,561 A | 1/2000 | Reed, Jr. et al. | 192/48.2 |
| 6,044,719 A | 4/2000 | Reed, Jr. et al. | 74/330 |
| 6,286,381 B1 | 9/2001 | Reed, Jr. et al. | 74/336 |
| 6,364,809 B1 | 4/2002 | Cherry | 477/86 |
| 6,715,597 B1 * | 4/2004 | Buchanan et al. | 192/70.12 |
| 6,789,658 B2 * | 9/2004 | Busold et al. | 192/103 F |
| 2005/0067251 A1 * | 3/2005 | Braford et al. | 192/70.12 |
| 2006/0006043 A1 * | 1/2006 | Koenig et al. | 192/113.3 |

* cited by examiner

DUAL CLUTCH TRANSMISSION CLUTCH COOLING CIRCUIT

CROSS-REFERENCE TO RELATED APPLICATION

The present application is a continuation-in-part of U.S. patent application Ser. No. 10/886,279, filed Jul. 7, 2004 and now abandoned, and entitled "Dual Clutch Transmission Clutch Cooling Circuit."

BACKGROUND OF THE INVENTION

1. Field of the Invention

The present invention relates, generally to a cooling circuit for a dual clutch transmission and, more specifically, to a hydraulic circuit used to controlling the flow of cooling fluid provided to each of the two clutches of a dual clutch transmission.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first, and oldest type is the manually operated transmission. These transmissions include a foot-operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second, and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions. The dual clutch structure is most often coaxially and co-centrically configured so as to derive power input from a single engine flywheel arrangement. However, some designs have a dual clutch assembly that is coaxial but with the clutches located on opposite sides of the transmissions body and having different input sources. Other designs are known in which the two clutches are non-coaxial with differing input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electromechanical type, since a lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions have overcome several drawbacks associated with conventional transmissions and the newer automated manual transmissions, it has been found that controlling and regulating the automatically actuated dual clutch transmission to achieve the desired vehicle occupant comfort goals is a complicated matter. There are a large number of events to properly time and execute within the transmission for each shift to occur smoothly and efficiently. In addition, the clutch and complex gear mechanisms, working within the close confines of the dual clutch transmission case, generate a considerable amount of heat. The heat build-up is aggravated by the nature of the clutch mechanisms themselves, each of which are typically constructed of two series of plates, or discs, one set connected in some manner to the output of the engine and the second attached to an input shaft of the transmission. Each of the set of plates include friction material. The clutch plates and discs are pressed together under pressure to a point at which the plates and discs make a direct physical connection. The clutch may be designed for a full "lock-up" of the plates and discs, or may be designed with a certain amount of "limited slip". Regardless, the slipping of the friction plates within a friction type clutch, whether from a designed limited slip or the normal uncontrolled slipping that occurs during clutch engagement and disengagement, generates heat that needs to be dissipated. A considerable amount of heat can be generated in the typical dual clutch transmission utilizing a combined coaxial clutch assembly wherein the one clutch fits within the second clutch.

In order to provide sufficient cooling to the clutch assemblies of the conventional dual clutch transmission, the clutch assemblies are usually bathed in transmission fluid in a generally uncontrolled manner. While this approach has generally worked for its intended purpose, disadvantages remain. Specifically, these types of conventional clutch cooling hydraulic circuits have failed either to adequately provide for proper cooling and heat reduction of the clutches of the dual clutch transmission or have resulted in producing large efficiency losses by excessively flooding of the clutch assemblies with fluid.

Of late, newer approaches in the structure of hydraulic circuits for clutch cooling have been proposed in the related art that offer improvements, but are still limited in their cooling capacity. In one example, a hydraulic circuit is employed that provides pressurized cooling oil directly from the pump to the clutches to maintain adequate flow and pressure and then passes the cooling fluid through a cooler device only on the return line to the sump. However, since the cooling fluid is not cooled on its way to the clutches, the cooling capacity of the applied cooling fluid is somewhat limited and larger quantities of fluid must be employed to adequately cool the clutch. This generally requires a larger pump and larger supply lines. In another example, the pressurized cooling fluid is pumped through a cooling unit prior to delivery to the clutches. However, this causes a distinct pressure drop and the system must contend with the flow limitations of the cooling unit.

These conventional clutch cooling approaches also use a single hydraulic circuit to supply cooling oil or fluid from the cooler device to the clutches. This causes the clutches to suffer inadequate and inefficient heat removal. Furthermore, the inadequacy of these conventional hydraulic circuits is also exaggerated under clutch high loading conditions where excessively high heat is built up rapidly in the active clutch. These inherently inadequate cooling circuit strategies lead to shortened component life and ultimate failure of the clutch assemblies within the dual clutch transmission. Similarly, inadequate cooling is responsible for rapid breakdown of the physical properties of the transmission fluid, which can cause failure of the other components within the transmission. Further, the conventional hydraulic circuits that excessively flood the clutch assemblies with cooling fluid also cause unnecessary clutch drag and put excessive demands on the pump resulting in poor clutch life and lower fuel efficiencies.

Accordingly, there remains a need in the related art for an improved hydraulic circuit to provide cooling fluid to the clutch assemblies of the dual clutch transmissions. Specifically, there is a need for a cooling circuit that provides cooling fluid from a cooling unit to the clutches normally and supplementally provides high flow cooling fluid from the pump under high load conditions. In this manner, clutch heat is dissipated by cooled cooling fluid normally and a supplemental flow of cooling fluid that is not limited by the flow restrictions of the cooling unit is further provided when the clutch comes under high load.

SUMMARY OF THE INVENTION

The disadvantages of the related art are overcome by the hydraulic circuit of the present invention for controlling the application of pressurized cooling fluid to the clutches of a dual clutch transmission. The circuit includes a cooling unit in fluid communication with a source of the pressurized cooling fluid and adapted to exchange heat from the cooling fluid with another media. The circuit also includes at least one regulator in fluid communication with the source of the pressurized cooling fluid and separately in fluid communication with the cooling unit, and further in fluid communication with the clutches. The regulator is adapted to operatively provide the cooling fluid to the clutches. The circuit also includes at least one control actuator adapted to selectively control the fluid regulator to provide a first variable predetermined amount of cooling fluid from the cooling unit to the clutches as primary cooling, and to provide a second variable predetermined amount of cooling fluid from the source to the clutches thereby supplementing the cooling fluid from the cooling unit.

Thus, the present invention overcomes the limitations of the current hydraulic circuits for clutch cooling in a dual clutch transmission by providing a controlled flow of cooling fluid from the cooling unit normally and providing a supplemental flow of cooling fluid directly from the pump when needed. In this manner, the use of directly pumped supplemental cooling fluid allows the size of the pump and cooling unit to remain relatively small. This provides efficiency and cost savings while properly protecting the clutches from heat damage. The present invention also allows immediate cooling flow to the clutches during periods of high loading when clutch temperatures rapidly increase. Furthermore, the present invention is adaptable to provide primary and supplemental clutch cooling when the structure of the transmission employs either co-centric or parallel clutch assemblies.

Other objects, features, and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
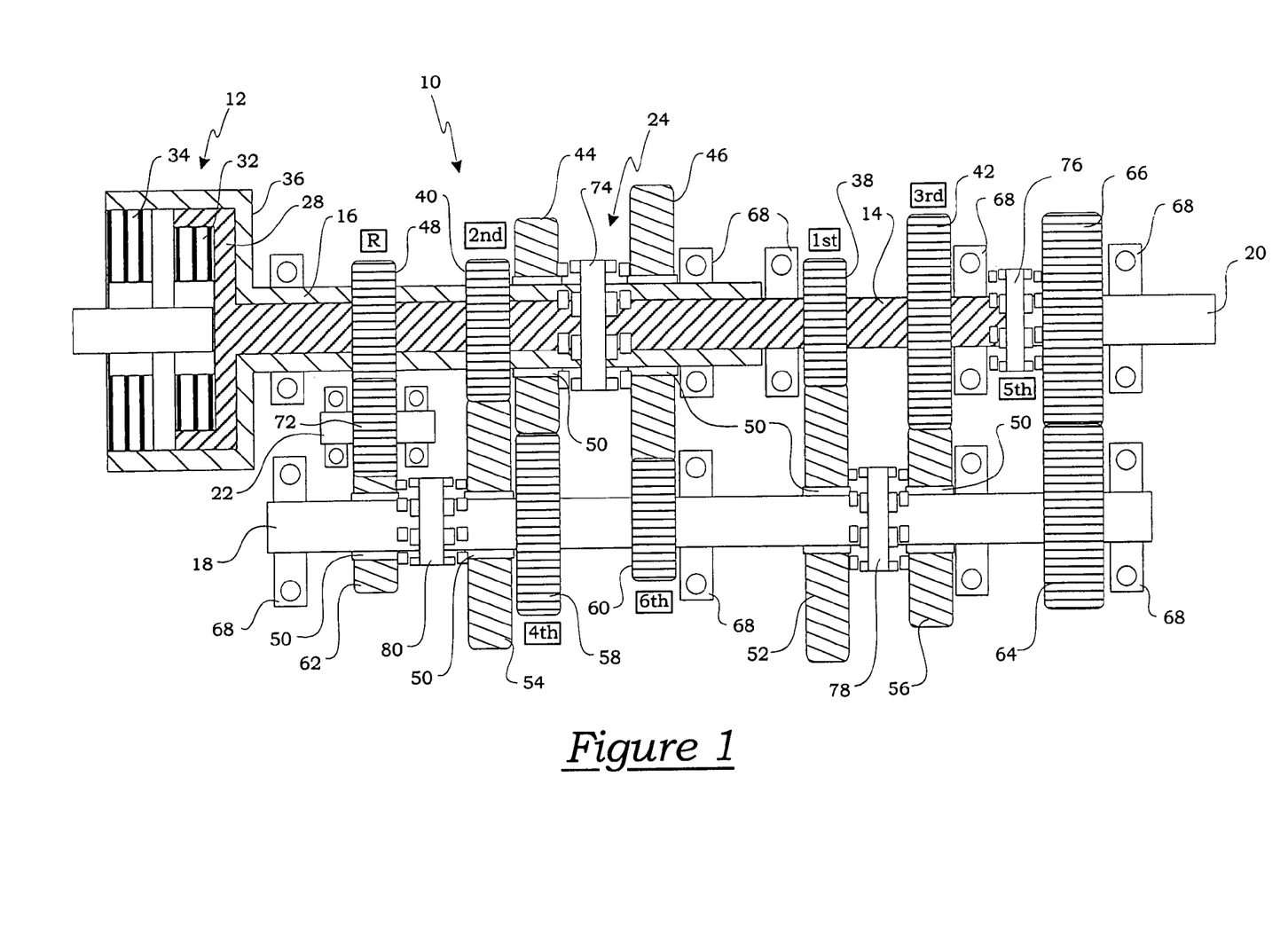
FIG. 1 is a schematic illustration of a dual clutch transmission of the type that may employ the clutch cooling circuit of the present invention.

A representative dual clutch transmission that may be controlled by the present invention is generally indicated at 10 in the schematic illustrated in FIG. 1. Specifically, as shown in FIG. 1, the dual clutch transmission 10 includes a dual, coaxial, co-centric clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24.

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators 26 to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. It should be appreciated that, although not illustrated herein, the first and second clutch mechanisms 32, 34 and the first and second input shafts 14, 16 may be physically arranged within the transmission in a parallel, rather than co-centric structure.

The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

The counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off of a center neutralized position to the right and engage another gear to its respective shaft when moved to the left. Specifically with reference to the example illustrated in FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76. It should be appreciated that this example of the dual clutch transmission is representative and that other gear set, synchronizer, and shift actuator arrangements are possible within the dual clutch transmission 10 as long as the even and odd gear sets are disposed on opposite input shafts.

It should be further appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch engagement functions. Thus, the control method of the present invention as described below is merely a portion, such as a sub-routine, or series of sub-routines, of a larger control scheme within the ECU.

The first and second clutch mechanisms 32 and 34 of the dual, coaxial clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as seen in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. This powershift changeover of the clutches 32 and 34 occurs for each shift change of the dual clutch transmission 10. As the inactive clutch (now the on-coming clutch) is engaged, the load applied causes a surge of power to be transferred across the clutch with an accompanying generation of heat from the slip that occurs across the clutch. The temperature of the on-coming clutch rapidly increases, or spikes, to a point where the clutch plates or the friction material could be damaged if proper cooling is not provided. Additionally, the heat build-up, if not properly dissipated, will greatly increase the overall temperature of the dual clutch transmission 10 and may cause the damaging effects mentioned above. Simultaneously, while the temperature of the on-coming clutch is sharply rising, the disengaging, or off-going, clutch will cease transmitting torque. With the removal of the load, the disengaged clutch will stop generating heat, thus sharply lowering its cooling requirement.

Figure 2:
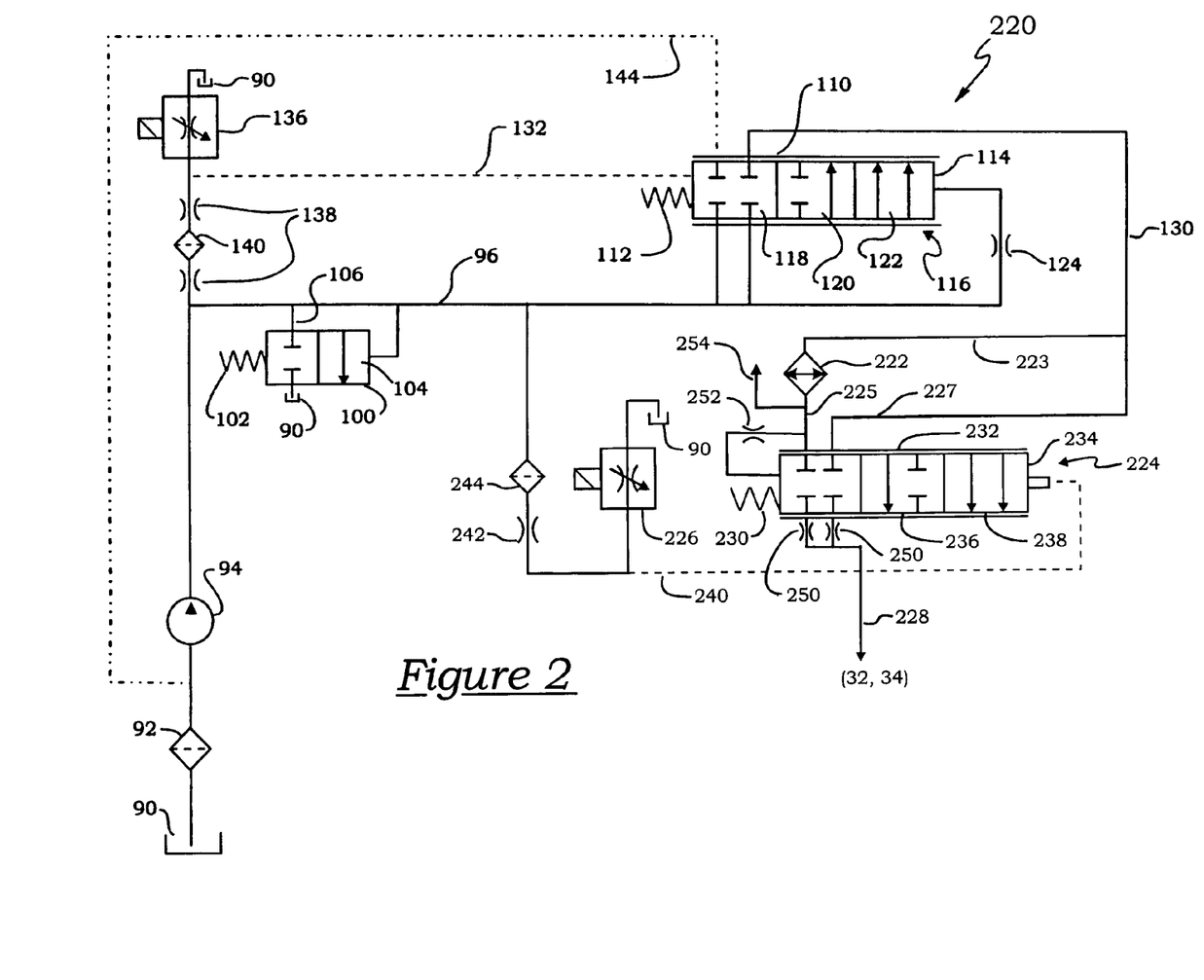
FIG. 2 is a schematic illustration of the hydraulic cooling circuit of the present invention for cooling the clutches of a dual clutch transmission.

The hydraulic circuit of the present invention is generally indicated at 220 in FIG. 2. The hydraulic circuit 220 includes a cooling unit 222 in fluid communication with a source of pressurized cooling fluid, through line 223 that is adapted to exchange heat from said cooling fluid with another media. As shown, pump 94 provides a source of pressurized cooling fluid, which is drawn from the sump 90. The hydraulic circuit 220 also includes at least one clutch cooling fluid regulator generally indicated at 224 and at least one control actuator 226. The clutch cooling fluid regulator 224 is in fluid communication with the source of the pressurized cooling fluid from the pump 94 through hydraulic line 130. More specifically, as illustrated in FIG. 2, the bulk of the cooling fluid is maintained in a sump 90. A pump 94 is used to provide positive pressure to the cooling fluid as it is drawn from the sump 90 through a filter 92. The pump output charges a main pressure line 96 that feeds the various components of the hydraulic circuit 220.

A pump pressure relief valve 100 is operatively connected in fluid communication with the main pressure line 96 to provide a maximum upper limit for the positive pressure provided by the pump 94. The pressure relief valve 100 is moved to its closed position, as shown in FIG. 2, by a biasing member 102. The biasing member 102 has a pre-determined spring force that corresponds to the desired maximum system pressure. In the advent that the pressure in the main pressure line 96 exceeds the pre-determined maximum, the excessive pressure, as applied to the right side of the valve, will move the valve member 104 of the pressure relief valve 100 to the left, overcoming the spring force of biasing member 102. In this manner, the previously blocked relief passage 106 is opened to the sump 90 allowing the excessive pressure to bleed off and dropping the pressure in the main pressure line 96 until the biasing member 102 can force the valve member 104 of the relief valve 100 back to its closed position.

The main pressure line 96 also feeds the main pressure regulator 110. The main pressure regulator 110 maintains the pressure in the main pressure line 96 at a pre-determined operating pressure, or setpoint. The main pressure regulator 110 is shown in FIG. 2 in its closed position and includes a biasing member 112 and a main valve member, schematically indicated at 114 with internal flow passages, generally indicated at 116. The flow passages 116 are shown in left 118, middle 120, and right 122 positions of the valve member 114. The pressure in the main pressure line 96 is supplied to the right side of the main regulator valve through a flow restrictor 124 that reduces the flow volume but maintains the applied pressure. With the pump 94 operating, the pressure delivered to the right side of the main pressure regulator 110 overcomes the spring force of the biasing member 112 and moves the valve member 114 of the regulator 110 to the right from the closed left position 118 to the middle operable position 120. Here, the internal flow passages 116 of the middle operable position 120 allow the flow of cooling fluid in the main pressure line 96 to flow into the regulated line 130. A regulating control line 132, shown as a dotted line in FIG. 2, provides a controllable biasing force to the left side of the main pressure regulator 110. The regulating control line 132 delivers a portion of the pressure from the main pressure line 96 to the left side of the regulator 110 under the control of the line pressure solenoid 136.

The line pressure solenoid 136 is electrically operated by and engine control unit (ECU) to set the regulated pressure setpoint within the regulating circuit 82 and then to maintain the desired pressure by regulating the output pressure to the setpoint. The line pressure solenoid 136 supplies a varying portion of the available main pressure through the regulating line 132 to the main pressure regulator 110 by bleeding off some portion of the main pressure as supplied through flow restrictors 138 and filter 140 to the sump 90. In this manner, the line pressure solenoid 136 sets the desired output pressure setpoint for the main pressure regulator 110. The line pressure solenoid 136 then varies the pressure in the regulating line 132 to maintain the output pressure delivered from the main pressure regulator 110 about the desired output pressure setpoint while accounting for fluctuations in the output pressure due to downstream pressure changes.

The main pressure regulator 110 also provides control over rapid increases, or surges, in the main pressure line 96 that exceeds the immediate correction ability of the line pressure solenoid 136. The right position 122 of the valve member 114 opens additional flow passages 116 that not only allow for the continued flow of fluid through the regulator 110 to the regulated line 130, but also allow a portion of the increased flow to pass to the suction line 144. The suction line 144 normally remains closed off by the left and middle positions 118, 120 of the valve member 114. However, when a sharp or rapid increase of pressure in the main pressure line 96 drives the valve member 114 all the way to the left, a corrective portion of the flow is fed back to the suction side of the pump 94. As the suction line 144 bleeds off the surge of excessive pressure flow, the regulator valve member 114 moves back to the middle operative position 120.

Thus, a source of the pressurized cooling fluid is provided to the clutch cooling fluid regulator 224. The clutch cooling fluid regulator 224 is also in fluid communication with the cooling unit 222 through inlet 225. Further, clutch cooling fluid regulator 224 is in fluid communication with the clutches 32, 34 such that the clutch cooling fluid regulator 224 is adapted to operatively provide cooling fluid to the clutches. Those having ordinary skill in the art will appreciate from the following discussion that the actual means of delivering the cooling fluid to the clutch mechanisms 32 and 34 is unimportant. Any of the various approaches for delivering fluid to clutch disks and plates, such as internal fluid passages extending through the input shafts or appropriately placed spray orifices as commonly known in the art may be employed in connection with the present invention illustrated in FIG. 2.

The control actuator 226 is adapted to selectively control the clutch cooling fluid regulator 224 to cause the clutch cooling fluid regulator 224 to provide a first variable predetermined amount of cooling fluid from the cooling unit 222 to the clutches as primary cooling. Further, the control actuator 226 is also adapted to cause the clutch cooling fluid regulator 224 to provide a second variable predetermined amount of cooling fluid from the source to the clutches thereby bypassing the cooling unit 222 as supplemental cooling.

More particularly, as shown in FIG. 2 the clutch cooling fluid regulator 224 provides a controlled flow of cooling fluid to the first and second clutches 32 and 34 of the dual clutch transmission 10 through output line 228. The clutch cooling fluid regulator 224 includes a biasing member 230 and a main valve body 232 having internal flow passages and a valve member 234 that is moveable between predetermined positions within the valve body 232 to open or close the valve flow passages. The fluid regulator 224 has an inlet 225 in fluid communication with a source of pressurized cooling fluid and a first outlet 228 with a first flow path in fluid communication with the clutches 32, 34 and further has a second outlet 229 with a second flow path also in fluid communication with the clutches 32,34. The valve member 234 has a first valve flow section 236 and a second valve flow section 238. The regulator control line 240 (shown as a dotted line) provides an actuating force to the right sides of the clutch cooling fluid regulator 224. The regulator control line 240 delivers a portion of the pressure from the main pressure line 96 under the control of the control actuator 226.

The control actuator 226 is electrically operated by the ECU to control the delivery of cooling fluid to the clutches by regulating the cooling fluid flow through the clutch cooling fluid regulator 224. The control actuator 226 supplies a variable portion of the available main pressure through the regulator control lines 240 to the clutch cooling fluid regulator 224 by operatively bleeding off some portion of the main pressure through flow restrictor 242 and filter 244 to the sump 90. The pressure supplied to the right side of the control actuator 226 moves the valve member 234 to the left. Under clutch low load or low stress conditions, the control actuator 226 causes the cooling fluid regulator 224 to provide a regulated supply of pressurized cooling fluid from the cooling unit 222 as the primary cooling source through the first valve flow section 236 of valve member 234 and out the first outlet 228. Under clutch high stress or heavy load conditions, the control actuator 226 causes the cooling fluid regulator 224 to provide a regulated supply of cooling fluid from the cooling unit 222 as the primary cooling source and additionally provide cooling fluid directly from the pump 94 through the second valve flow section 238 and out the second outlet 229 to supplement the primary.

The decision of whether the cooling fluid flow should be delivered from either the first flow section 236 or the second valve flow section 238 is predetermined and under a higher level control through the ECU. The predetermined threshold of when it is necessary to supply supplemental cooling directly from the pump 94 (through second valve flow section 238) is a design consideration beyond the scope of the present invention. However, it should be appreciated that the maximum pressure and flow available for the primary source of cooling through the cooling unit 222 is held to the pressure and flow limitations of the cooling unit itself. Thus, any cooling requirements that exceed the maximum capacity of the cooling unit 222 will likely require a supplemental flow directly from the pump 94.

Flow restrictors 250 stabilize the applied volume of cooling fluid and prevent surges of cooling fluid to the clutches as the supply flow is regulated. In this case, the restrictors are used in combination with the flow through the valve to set the flow volume to the clutches. The regulator 224 controls the pressure and when the regulator is fully open the applied pressure will equal the line pressure. A biasing pressure from the supply of the cooling unit 222 is applied to the right side of the valve member 234 through a restrictor 252 to supplement the biasing force of the biasing member 230. This assists the biasing member 230 in returning the valve member 234 to the closed position when the applied controlling pressure through the regulator control line 240 is removed or drops. It should be noted that line 225 from the cooling unit 222 may also provide a portion of the pressurized fluid to other parts of the dual clutch transmission 10 for any of a variety of purposes such as cooling and lubrication of additional components, as indicated by supply outlet line 254.

It should also be appreciated that other routing arrangements may also be employed without departing from the scope of the present invention. For example, the input pressure to the cooling unit 222 may be separately regulated from the line pressure, or the input pressure to the fluid regulator 222 may be unregulated. Furthermore, the cooing unit 222 may be a heat exchanger physically disposed outside of the transmission and exposed to an air stream to allow heat to transfer from the cooling fluid to the air stream. The cooling unit may also be outside of the transmission and physically disposed within another heat exchanger within the vehicle, such as the vehicle's main radiator so that the cooling unit is exposed to the liquid media of the radiator to allow heat to transfer from said cooling fluid to the liquid media.

Figure 2A:
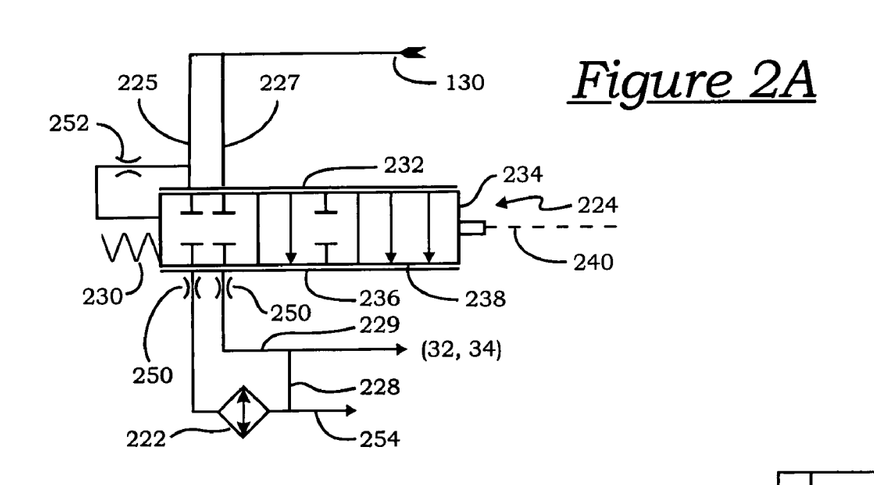
FIG. 2A is a detailed schematic illustration of the regulator shown in FIG. 2 with a variation in the hydraulic cooling circuit of the present invention for cooling the clutches of a dual clutch transmission.

One particular example of an alternate circuit arrangement is illustrated in FIG. 2A, which is a detailed section of the overall circuit in the vicinity of the clutch cooling fluid regulator 224. In this example, the line pressure input 130 is spilt prior to the regulator 224 and the cooling unit 222 is placed on the outlet side of the regulator in the outlet line 228 to the clutches. In the preferred embodiment, as illustrated in the FIG. 2A, the cooling unit is placed in the first flow path to the clutches. Supply outlet line 254, which supplies lubrication and supplemental hydraulic circuits in the transmission, may be placed in the outlet line 228 as shown in FIG. 2A or remain on the inlet side as in FIG. 2.

Figure 2B:
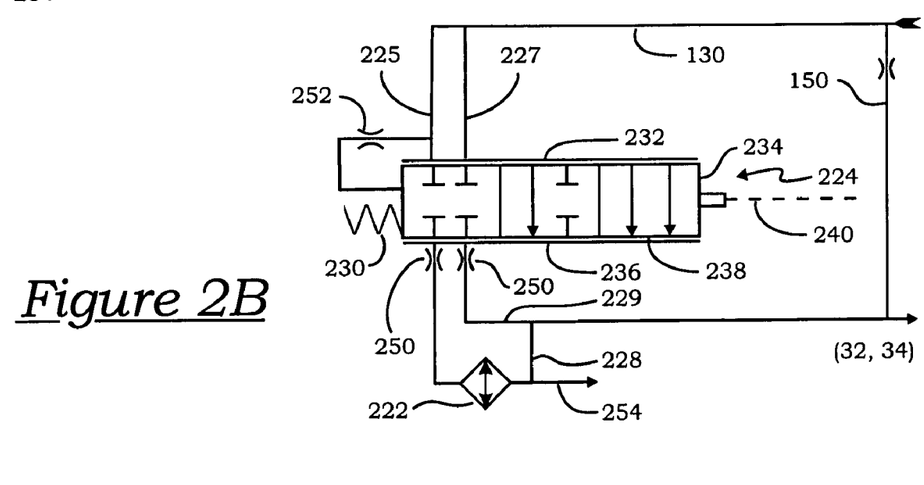
FIG. 2B is a detailed schematic illustration of the regulator shown in FIG. 2 with another variation in the hydraulic cooling circuit of the present invention for cooling the clutches of a dual clutch transmission.

In another example of an alternate circuit arrangement, FIG. 2B illustrates a hydraulic circuit that includes a primary flow path 150 in fluid communication with the source of pressurized cooling fluid through line 130 and the clutches 32, 34. The primary flow path 150 is adapted to provide a constant controlled flow of cooling fluid as primary cooling. As first supplemental cooling, the regulator 224 opens a first flow path, through inlet 225, to provide a first variable predetermined amount of cooling fluid to the clutches 32, 34. The regulator 224 is also adapted to open a second flow path, through inlet 227, in addition to the first flow path to provide a second variable predetermined amount of cooling fluid to the clutches 32, 34 to provide a second supplemental cooling. This is in addition to the first variable predetermined amount of cooling fluid. In this example, the cooling unit 222 is illustrated on the outlet side of the regulator 224 in the first flow path to the clutches. However, it should be appreciated that the cooling unit 222 may also be equally disposed in the second flow path to the clutches or on the inlet side of the regulator 224.

Figure 3:
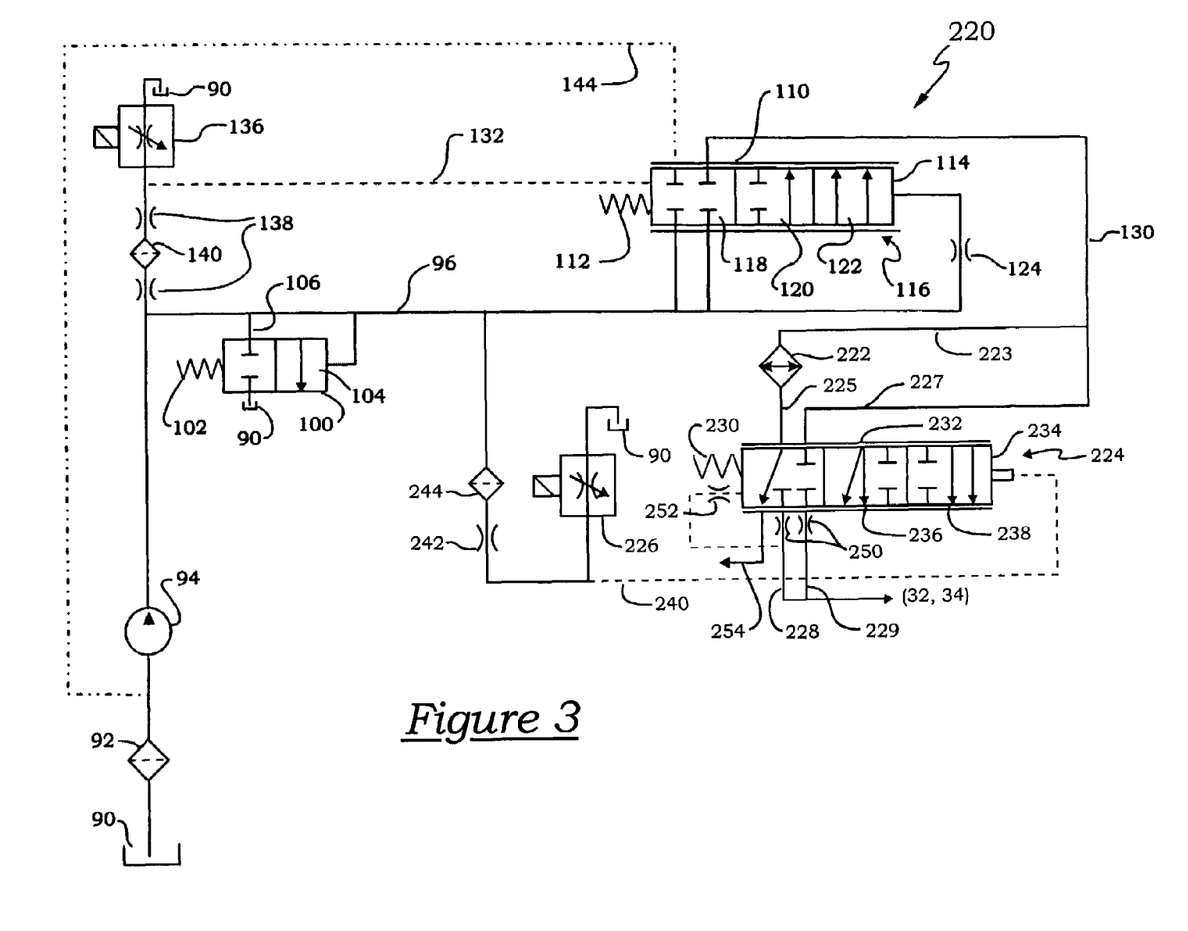
FIG. 3 is a schematic illustration of another example of the hydraulic cooling circuit of the present invention for cooling the clutches of a dual clutch transmission.

Another example of an alternate hydraulic cooling circuit is illustrated in FIG. 3. In FIG. 3 the regulator 224 has slightly different internal passages that provide a third outlet so that the additional supply outlet 254 is moved to the outlet side of the regulator as a third flow path. The third flow path feeds the supplemental hydraulic circuits within the transmission (not shown). Thus, the regulator 224 has a first operative position where the third flow path is open during low demand conditions. When primary cooling is needed, the regulator 224 moves to a second operative position where the first and third flow paths. Further, if supplemental cooling is needed, the regulator 224 has a third operative position where the first and third flow paths are open and the third flow path to line 254 is closed off.

Figure 3A:
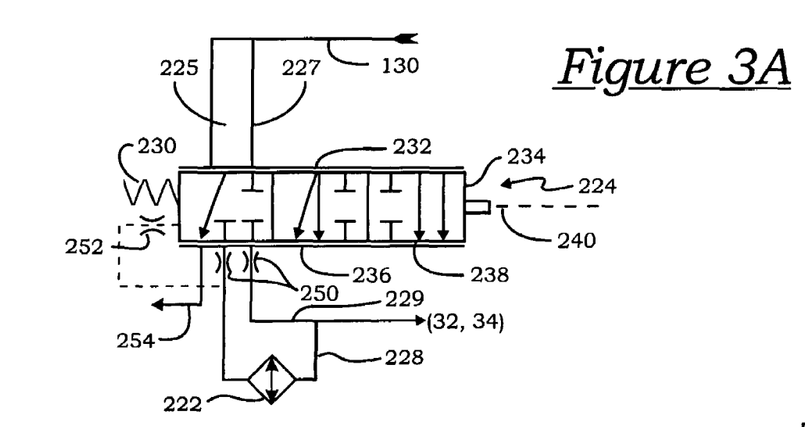
FIG. 3A is a detailed schematic illustration of the regulator shown in FIG. 3 with a variation in the hydraulic cooling circuit of the present invention for cooling the clutches of a dual clutch transmission.
Figure 3B:
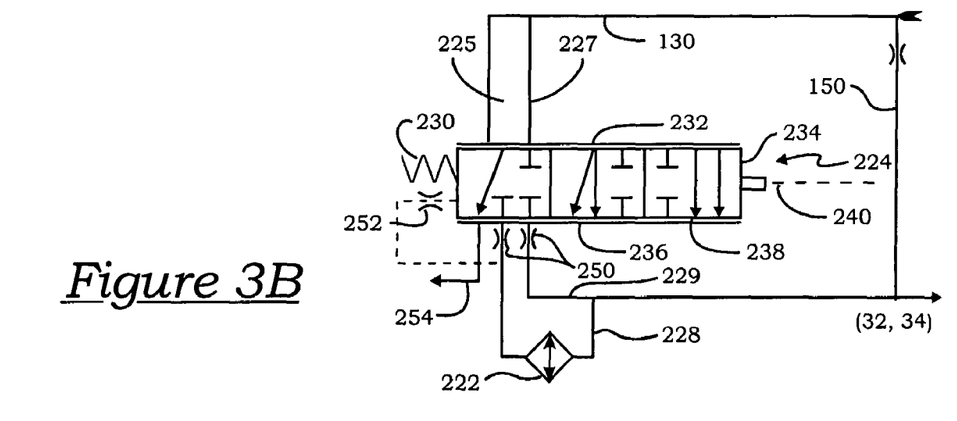
FIG. 3B is a detailed schematic illustration of the regulator shown in FIG. 3 with another variation in the hydraulic cooling circuit of the present invention for cooling the clutches of a dual clutch transmission.

This regulator valve configuration may be employed in additional circuit variations that are illustrated in FIGS. 3A and 3B. More specifically, FIG. 3A is a detailed section of the overall circuit in the vicinity of the clutch cooling fluid regulator 224. Here the line pressure input 130 is spilt prior to the regulator 224 and the cooling unit 222 is placed on the outlet side of the regulator in the outlet 228 to the clutches. In the preferred embodiment, as illustrated in the FIG. 2A, the cooling unit is placed in the first flow path to the clutches. Supply outlet line 254 supplies lubrication and supplemental hydraulic circuits in the transmission and may be branched from outlet 228 as shown in FIG. 2A or remain on the inlet side as in FIG. 2.

In FIG. 3B, the same regulator valve approach is used, but the circuit further includes a primary flow path 150 in fluid communication with the source of pressurized cooling fluid, through line 130 and the clutches 32, 34. The primary flow path 150 is adapted to provide a constant controlled flow of cooling fluid as primary cooling. As first supplemental cooling, the regulator 224 opens a first flow path, through inlet 225 to provide a first variable predetermined amount of cooling fluid to the clutches 32, 34. The regulator 224 is also adapted to open a second flow path, through inlet 227, in addition to the first flow path to provide a second variable predetermined amount of cooling fluid to the clutches 32, 34 to provide a second supplemental cooling. This is in addition to the first variable predetermined amount of cooling fluid. In this example, the cooling unit 222 is illustrated on the outlet side of the regulator 224 in the first flow path to the clutches. However, it should be appreciated that the cooling unit 222 may also be equally disposed in the second flow path to the clutches or on the inlet side of the regulator 224.

Depending on the physical structure and particular operative design considerations of the dual clutch transmission, the hydraulic circuit of the present invention may also include a second clutch cooling fluid regulator and a second control actuator. More specifically, as previously discussed, dual clutch transmissions other than the type generally described with regard to FIG. 1 are known to have non-cocentric clutch configurations. In these cases, proper cooling of the separate clutch mechanisms may be better served by supplying and controlling the flow of cooling fluid to each of the clutches independently.

Figure 4:
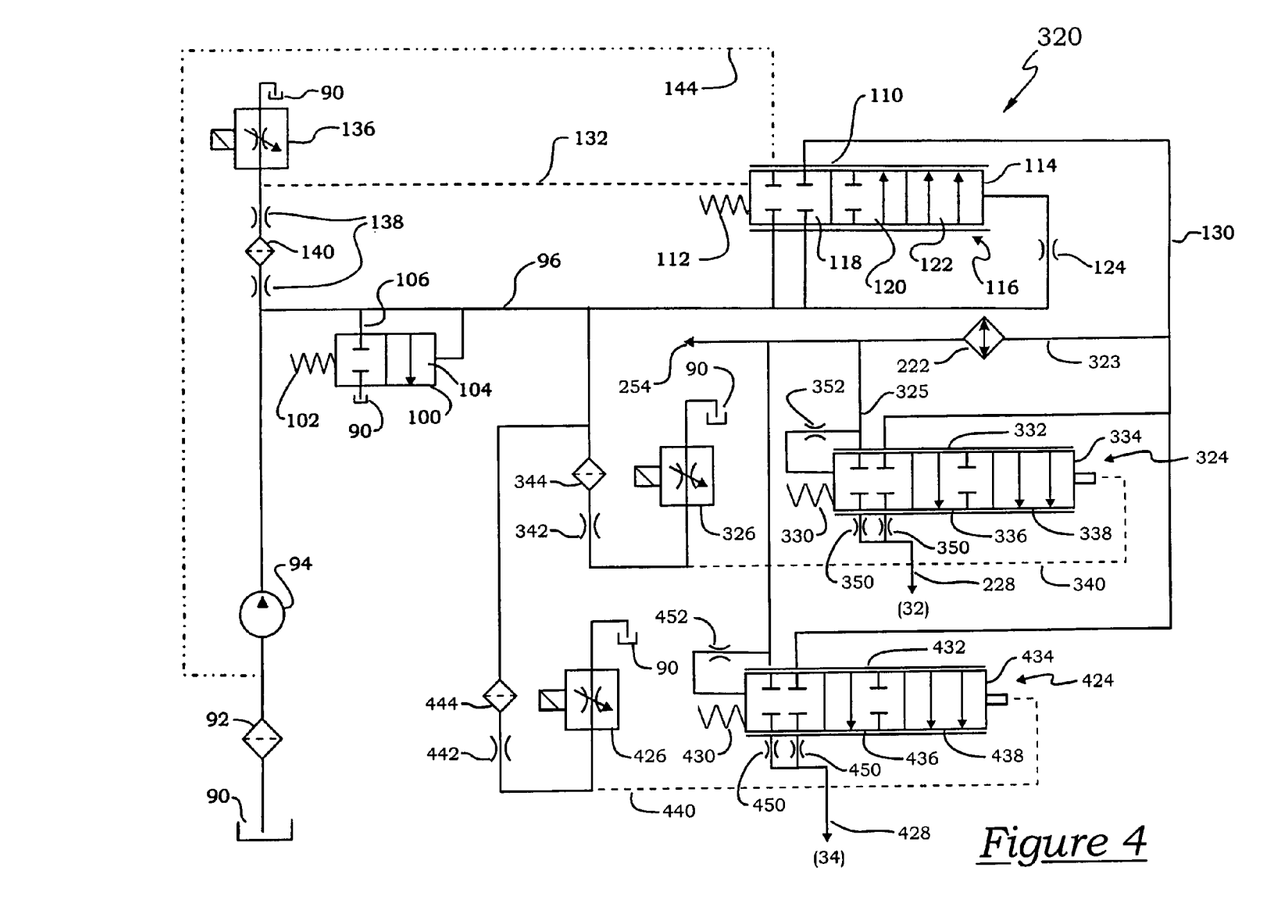
FIG. 4 is a schematic illustration of another example of the hydraulic cooling circuit of the present invention for controlling a separate and independent flow of cooling fluid to each of the clutches of a dual clutch transmission.

For example, referring now to FIG. 4, where like numerals incremented by 100 are used to designate like structure, another embodiment of the hydraulic circuit of the present invention is generally indicated at 320. The hydraulic circuit 320 is adapted to separately and independently provide a flow of cooling fluid to the two clutches of a dual clutch transmission. The hydraulic circuit 320 includes a first clutch cooling fluid regulator 324, a first control actuator 326, a second clutch cooling fluid regulator 424, and a second control actuator 426. The fluid regulators 324 and 424 are each in fluid communication with the source of the pressurized cooling fluid from the pump 94 and are each separately in fluid communication with the cooling unit 322. Further, the first fluid regulator 324 is in fluid communication with one of the clutches (32) and the second fluid regulator 424 is in fluid communication with the second of the clutches (34) such that the first and second fluid regulators 324, 424 are adapted to operatively and separately provide cooling fluid to each of the clutches.

The control actuators 326 and 426 are adapted to selectively control their respective fluid regulators 324 and 424 to cause the fluid regulators to separately provide a first variable predetermined amount of cooling fluid from the cooling unit 222 to the respective clutches as primary cooling, and also to cause the fluid regulators to separately provide a second variable predetermined amount of cooling fluid from the source to the respective clutches thereby bypassing the cooling unit 322 as a supplemental cooling source.

The clutch cooling fluid regulators 324 and 424 are substantially similar to each other and to the single clutch cooling fluid regulator 224 described in reference to FIG. 2. Each clutch cooling fluid regulator provides a controlled flow of cooling fluid to one of the first and second clutches 32 and 34 of the dual clutch transmission 10 through output lines 328 and 428, respectively. The fluid regulators 324 and 424 each respectively include a biasing member 330, 430 and a main valve body 332, 432 having internal flow passages and a valve member 334, 434 that is moveable between predetermined positions within the valve body 332, 432 to open or close the valve flow passages. The valve members 334, 434 have a first valve flow section 336, 436 and a second valve flow section 338, 438, respectively. The regulator control lines 340 and 440 (shown as a dotted line) provide an actuating force to the right sides of the clutch cooling fluid regulators 324, 424. The regulator control lines 340 and 440 deliver a portion of the pressure from the main pressure line 96 under the control of the control actuators 326 and 426, respectively.

The control actuators 326 and 426 are electrically operated by the ECU to control the delivery of cooling fluid to each of the clutches independently by regulating the cooling flow through the fluid regulators 324 and 424. Each of the control actuators 326 and 426 supply a variable portion of the available main pressure through the regulator control lines 340 and 440 to the fluid regulators 324 and 424 by operatively bleeding off some portion of the main pressure through flow restrictors 342, 442 and filters 344, 444 to the sump 90. The pressure supplied to the right side of the fluid regulators 324 and 424 moves the valve members 334 and 434 to the left to allow the cooling fluid in the regulated line 130 to pass from the output lines 328 and 428 to the clutches 32, 34. Under low clutch load or low stress conditions, the control actuators 326, 426 cause the cooling fluid regulators 324, 424 to provide a regulated supply of pressurized cooling fluid from the cooling unit 322 as the primary cooling source through the first valve flow sections 336, 436 of valve members 334, 434. Under clutch high stress or heavy load conditions, the control actuators 326, 426 cause the cooling fluid regulator 324, 424 to provide a regulated supply of cooling fluid from the cooling unit 322 as the primary cooling source and additionally provide cooling fluid directly from the pump 94 through the second valve flow sections 338, 438.

The decision of whether the cooling fluid flow should be delivered from either the first valve flow sections 336, 436 or the second valve flow sections 338, 438 of the valve members 334, 434 to the respective clutches 32, 34 is predetermined and under a higher level control through the ECU. The predetermined threshold of when it is necessary to supply supplemental cooling directly from the pump 94 (through second valve flow sections 338, 438) is a design consideration that is beyond the scope of the present invention. However, it should be appreciated that the maximum pressure and flow available for the primary source of cooling through the cooling unit 322 is held to the pressure and flow limitations of the cooling unit itself. Thus, any cooling requirements that exceed the maximum capacity of the cooling unit 322 will likely require a supplemental flow directly from the pump 94. It should be further appreciated that since the control the separate fluid regulators are independent from each other, the cooling fluid flow for each may be separately directed as necessary depending on the differing operating conditions for each clutch.

Flow restrictors 350, 450 stabilize the applied pressure and prevent surges of cooling fluid to the clutches as the supply flow is regulated. A biasing pressure from the supply of the cooling unit 322 is applied to the right side of the valve members 334, 434 through a restrictor 352, 452 to supplement the biasing force of the biasing members 330, 430. This assists the biasing member 330, 430 in returning the valve member 334, 434 to the closed position when the applied controlling pressure through the regulator control line 340, 440 is removed or drops. It should be noted that line 254 from the cooling unit 222 may also provide a portion of the pressurized fluid to other parts of the dual clutch transmission 10 for any of a variety of purposes such as cooling and lubrication of additional components.

Thus, the present invention overcomes the limitations of the current hydraulic circuits for clutch cooling in a dual clutch transmission by providing a controlled flow of cooling fluid from the cooling unit normally and providing a supplemental flow of cooling fluid directly from the pump when needed. In this manner, the use of directly pumped supplemental cooling fluid allows the size of the pump and cooling unit to remain relatively small. This provides efficiency and cost savings while properly protecting the clutches from heat damage. The present invention also allows immediate cooling flow to the clutches during periods of high loading when clutch temperatures rapidly increase. Furthermore, the present invention is adaptable to provide primary and supplemental clutch cooling when the structure of the transmission employs either co-centric or parallel clutch assemblies.

The invention has been described in an illustrative manner. It is to be understood that the terminology that has been used is intended to be in the nature of words of description rather than of limitation. Many modifications and variations of the invention are possible in light of the above teachings. Therefore, within the scope of the claims, the invention may be practiced other than as specifically described.

We claim:

1. A hydraulic circuit for controlling the application of pressurized cooling fluid to the clutches of a dual clutch transmission, said circuit including:
   a cooling unit in fluid communication with a source of said pressurized cooling fluid and adapted to exchange heat from said cooling fluid with another media;
   first and second regulators in fluid communication with said source of pressurized cooling fluid and separately in fluid communication with said cooling unit, said first regulator being in fluid communication with a first clutch of the dual clutch transmission, said second regulator being in fluid communication with a second clutch of the dual clutch transmission such that said first regulator is adapted to operatively provide said cooling fluid to the first clutch and said second regulator is adapted to operatively provide said cooling fluid to the second clutch; and
   at least one control actuator adapted to selectively control said regulator to provide a first variable predetermined amount of cooling fluid from said cooling unit to said clutches as primary cooling, and also to provide a second variable predetermined amount of cooling fluid from said source to said clutches thereby supplementing said cooling fluid from said cooling unit.

2. A hydraulic circuit as set forth in claim 1 wherein the said circuit further includes a second control actuator adapted to selectively control said second regulator to cause said second regulator to provide a first variable predetermined amount of cooling fluid from said cooling unit to the second clutch as primary cooling, and also to cause said second regulator to provide a second variable predetermined amount of cooling fluid from said source of pressurized cooling fluid to the second clutch thereby supplementing said cooling fluid from said cooling unit.

3. A hydraulic circuit as set forth in claim 1 wherein said cooling unit is a liquid to air heat exchanger that is exposed to an air stream to allow heat to transfer from said cooling fluid to said air stream.

4. A hydraulic circuit as set forth in claim 1 wherein said cooling unit is a liquid to liquid heat exchanger disposed within another heat exchanger within the vehicle such that said cooling unit is exposed to a liquid media to allow heat to transfer from said cooling fluid to said liquid media.

5. A hydraulic circuit for controlling the application of pressurized cooling fluid to the clutches of a dual clutch transmission, said circuit including:
   a first regulator having an inlet in fluid communication with a source of pressurized cooling fluid and having a first outlet with a first flow path in fluid communication with a first clutch of the dual clutch transmission and further having a second outlet with a second flow path in fluid communication with the first clutch of the dual clutch transmission, a second regulator having an inlet in fluid communication with a source of pressurized cooling fluid and having a first outlet with a first flow path in fluid communication with a second clutch of the dual clutch transmission and further having a second outlet with a second flow path in fluid communication with the second clutch of the dual clutch transmission such that said first and second regulators are adapted to provide said cooling fluid to the first and second clutches of the dual clutch transmission; and
   a control actuator adapted to selectively control said first and second regulators to cause said fluid regulators to open their respective first flow paths to provide a first variable predetermined amount of cooling fluid to the first and second clutches as primary cooling, said actuator further adapted to cause said first and second regulators to open their respective second flow paths in addition to their respective first flow paths to provide a second variable predetermined amount of cooling fluid to the first and second clutches to supplement said first variable predetermined amount of cooling fluid.

6. A hydraulic circuit as set forth in claim 5 that further includes a cooling unit operatively disposed in the first flow paths and in fluid communication with said first outlet of said first and second regulators and the first and second clutches such that said pressurized cooling fluid in said first flow path is cooled by said cooling unit.

7. A hydraulic circuit as set forth in claim 5 that further includes a cooling unit operatively disposed in the second flow paths and in fluid communication with said second outlet of said first and second regulators and the first and second clutches such that said pressurized cooling fluid in said second flow path is cooled by said cooling unit.

8. A hydraulic circuit as set forth in claim 5 wherein said first and second regulators further include a second inlet such that when said first flow path is open, said first inlet provides said pressurized cooling fluid to said first outlet and when said second flow path is open said second inlet provides said pressurized cooling fluid to said second outlet.

9. A hydraulic circuit as set forth in claim 8 that further includes a cooling unit operatively disposed between and in fluid communication with said source of pressurized cooling fluid and said first inlet of said first and second regulators such that said pressurized cooling fluid in said first flow paths is cooled by said cooling unit.

10. A hydraulic circuit as set forth in claim 8 that further includes a cooling unit operatively disposed between and in fluid communication with said source of pressurized cooling fluid and said second inlet of said first and second regulators such that said pressurized cooling fluid in said second flow paths is cooled by said cooling unit.

11. A hydraulic circuit as set forth in claim 5 wherein said regulator further includes a third outlet that provides a third flow path in fluid communication with supplemental hydraulic circuits of said transmission, said first and second regulators having a first operative position where said third flow path is open, a second operative position where said first and said third flow paths are open, and a third operative position where said first and said second flow paths are open, said first and second regulators operable to move between said first, said second, and said third positions to regulate the flow of said pressurized cooling fluid to said flow paths.

12. A hydraulic circuit for controlling the application of pressurized cooling fluid to the clutches of a dual clutch transmission, said circuit including:
a fluid regulator having an inlet in fluid communication with a source of said pressurized cooling fluid and having a first outlet with a first flow path in fluid communication with said clutches, a second outlet with a second flow path in fluid communication with said clutches, and a third outlet that provides a third flow path in fluid communication with supplemental hydraulic circuits of said transmission, said regulator having a first operative position where said third flow path is open, a second operative position where said first and said third flow paths are open, and a third operative position where said first and said second flow paths are open, said regulator operable to move between said first, said second, and said third positions to regulate the flow of said pressurized cooling fluid to said flow paths;
a control actuator adapted to selectively control said fluid regulator to cause said fluid regulator to open said first flow path to provide a first variable predetermined amount of cooling fluid to said clutches as a first supplemental cooling, said actuator further adapted to cause said fluid regulator to open said second flow path in addition to said first flow path to provide a second variable predetermined amount of cooling fluid to said clutches to provide a second supplemental cooling in addition to said first variable predetermined amount of cooling fluid; and
a primary flow path in fluid communication with said source of pressurized cooling fluid and said clutches that is adapted to provide a constant controlled flow of cooling fluid as primary cooling.

13. A hydraulic circuit as set forth in claim 12 that further includes a cooling unit operatively disposed in said first flow path and in fluid communication with said first outlet of said regulator and said clutches such that said pressurized cooling fluid in said first flow path is cooled by said cooling unit.

14. A hydraulic circuit as set forth in claim 12 that further includes a cooling unit operatively disposed in said second flow path and in fluid communication with said second outlet of said regulator and said clutches such that said pressurized cooling fluid in said second flow path is cooled by said cooling unit.

15. A hydraulic circuit as set forth in claim 12 wherein said inlet of said regulator is a first inlet and said regulator further includes a second inlet, such that when said first flow path is open said first inlet provides said pressurized cooling fluid to said first outlet and when said second flow path is open said second inlet provides said pressurized cooling fluid to said second outlet.

16. A hydraulic circuit as set forth in claim 15 that further includes a cooling unit operatively disposed between and in fluid communication with said source of pressurized cooling fluid and said first inlet of said regulator such that said pressurized cooling fluid in said first flow path is cooled by said cooling unit.

17. A hydraulic circuit as set forth in claim 15 that further includes a cooling unit operatively disposed between and in fluid communication with said source of pressurized cooling fluid and said second inlet of said regulator such that said pressurized cooling fluid in said second flow path is cooled by said cooling unit.

* * * * *